United States Patent Office 3,557,269
Patented Jan. 19, 1971

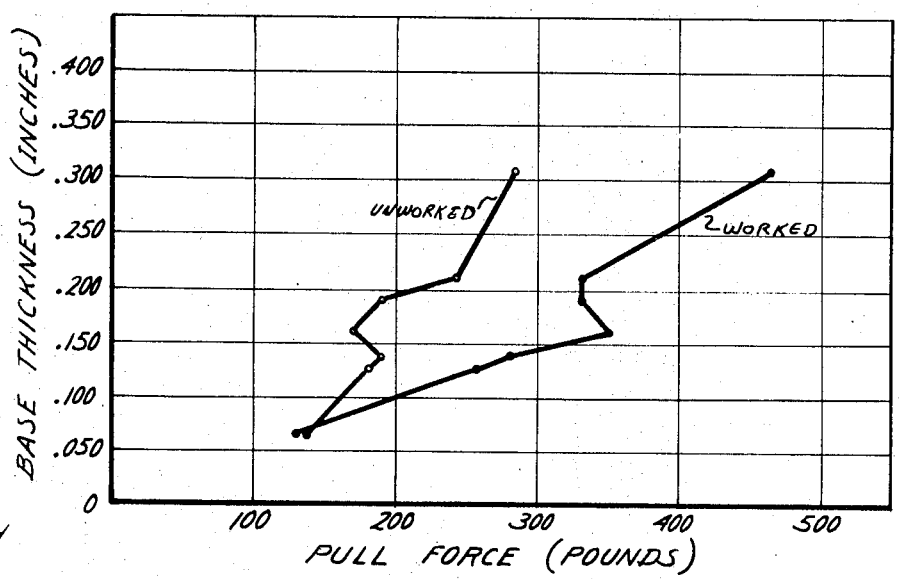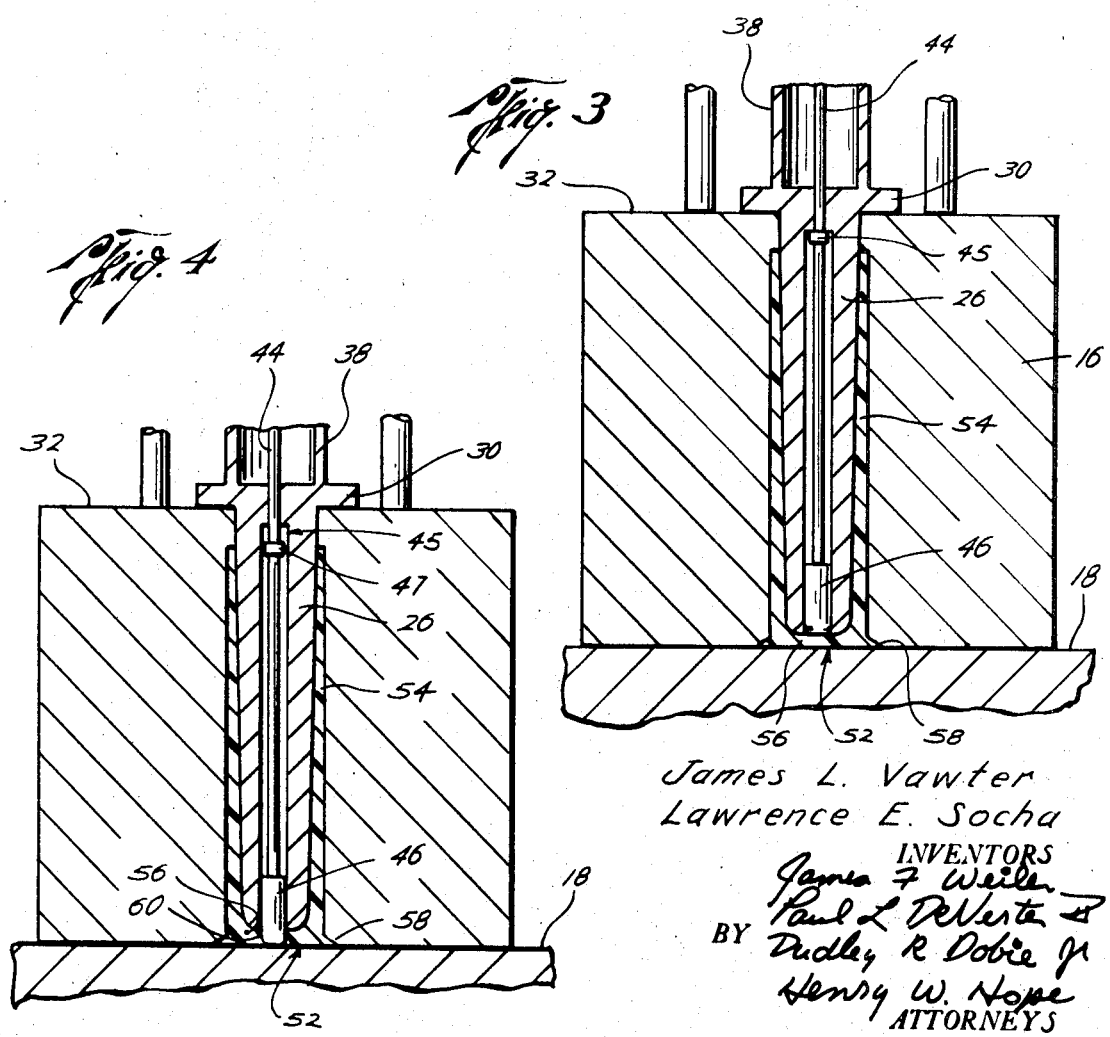

3,557,269
DOUBLE COMPRESSION METHOD FOR
FORMING A PLASTIC SHELLCASE
James L. Vawter and Lawrence E. Socha, El Campo,
Tex., assignors to Vawter Ammunition, Inc., El Campo,
Tex., a corporation of Texas
Filed June 7, 1966, Ser. No. 555,890
Int. Cl. B29c 3/00
U.S. Cl. 264—154                                     4 Claims

ABSTRACT OF THE DISCLOSURE

The present invention is directed to the manufacture of plastic articles such as for shotshell casings and the like requiring an oriented base portion. The invention utilizes a primary compression step to form the basic configuration of the cartridge and to orient the sidewalls thereof. A secondary compression step is then employed to apply pressure in the base area, thereby orienting this base area.

---

Figure 2:
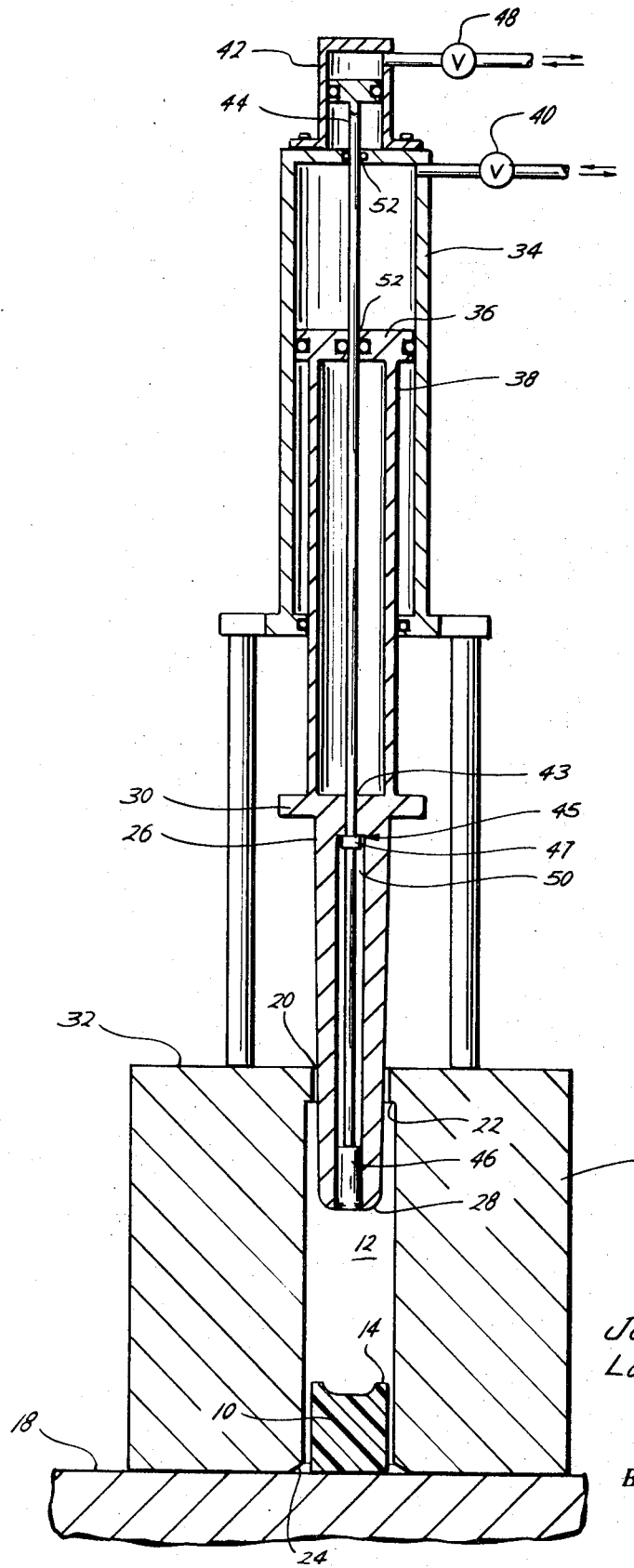

The present invention relates to a method for forming plastic into a tubular element having a base portion and being composed of plastic which is in a highly oriented state, and more particularly, to a method for forming a plastic tubular element for use as shotshell casings and the like, having the base and rim portion composed of plastic in a highly oriented state.

From the early days of the manufacture of shotshell casings through today, the casings have been composed primarily of a heavy paper which has been impregnated with wax. The base portion of the shotshell casings consisted of a metal cap containing the primer. Even though widely used, this type of construction has certain disadvantages which are well-known, and which it is an object of the present invention to overcome. Complex and expensive processes are required for the manufacture of the paper which is used in the shotshell casings, and for the assembly of the paper casings and the metal base. The paper construction is more susceptible to damage from moisture, in particular, the absorption of moisture causing swelling thus making possible the jamming of the gun, or wetting the powder which prevents the firing of the shell. Due to the extreme pressures and temperatures to which the shotshell casings are subjected upon being fired, paper casings often are torn apart. This can result in the torn pieces of paper jamming the gun. This can also subject the gun to exposure of burning gases which are given off when the shell is fired resulting in possible damage to the gun as well as to the shooter. A further disadvantage is that some paper casings are not readily adapted to reloading which has become increasingly popular with today's shooters.

To remedy these disadvantages, manufacturers have turned to the use of plastic shell casings, such as disclosed in U.S. Pat. Nos. 3,125,924; 3,171,350; and 3,103,170.

Various approaches have been adopted in manufacturing these plastic shotshell casings. One method is to mold the casing from plastics. Articles made this way, however, have failed when subjected to the high pressures and temperatures present when firing the shell. Another approach is to replace the paper portion with a plastic tubular member which has been highly oriented by stretching it. This method, however, requires a base made of metal thus resulting in increased cost of manufacture and subjecting the casing to failure at the joint between the plastic tubular member and the metal base. A third method is by forming the casing by a process of compression. This produces a shell casing having the tubular portion composed of a highly oriented plastic and with the desired strength, but with the base portion in an unoriented state.

As a result of the base being in an unoriented state and accordingly, being relatively weak, the casings once again require a metal rim or cap. The cap is to allow proper operation of the ejection mechanism which functions by acting on a rim extending outwardly from the base. Due to the relative weakness of the unoriented plastic base and rim, the ejection mechanism may fail to operate properly absent a metal base portion, or may damage the rim, thus preventing reuse of the casing.

The present invention overcomes the aforementioned disadvantages, by providing a shell casing integrally composed of plastic formed from a single plastic slug in such a manner as to provide a finished product composed of plastic, in a highly oriented state, both in the tubular portion and the base and rim portion. The method of forming the shell casing utilizes a mold cavity into which is placed the plastic slug. Both the slug and the cavity are then heated to a predetermined temperature. A male die member is forced into the die cavity in a predetermined manner, whereby the shell casing is formed. It is necessary to have an opening for the primer in the base of any shell casing, whether they are the type manufactured according to the present invention or by prior art methods. It is by the formation of this hole that the highly oriented state of the base and rim portion is achieved.

After the initial formation by compression, which places the tubular portion of the casing in a highly oriented state, a delayed action or secondary compression takes place. This compression is in the form of a punch which forces a hole in the base while preventing any material from leaving the base. In this manner, the base is subjected to a second compression which forms a hole in the base, and thereby, compresses the material making up the base into what is, in effect, a smaller area.

As the result of this secondary compression, an integral shell casing is formed having both its tubular portion and its base and rim portion in a highly oriented state. Accordingly, the tubular portion has sufficient strength to resist tearing and breaking apart when subjected to the high pressures and temperatures present upon firing the shell. The outer ends of the tubular portion have sufficient strength and resiliency whereby they may be folded inwardly a plurality of times thus forming a seal and allowing the casing to be reused. The base and the rim have sufficient strength to allow the ejection mechanism of the gun to operate properly without the necessity of a metal cap or base and to prevent resultant damage to the rim.

It is, therefore, an object of the present invention to provide a shell casing composed entirely of highly oriented plastic, providing sufficient strength whereby the casing can be fired and reused.

Another object of the present invention is to provide a shell casing having both the tubular portion and the base and rim portion of sufficient strength to be subjected without resultant damage to the high temperatures and pressures present when the shell is fired.

A still further object is to provide a shell casing having this desired strength in both the tubular and the base and rim portion by forming these portions from plastic in a highly oriented state.

Another object is to provide a shell casing having a base and rim portion of sufficient hardness and strength to allow the rejection mechanism of a gun to operate properly without damage to the rim.

An additional object of the present invention is to provide a novel and unobvious method of manufacturing such a shell casing which is simple and inexpensive to perform.

A still further object is to provide a method of forming such a shell casing from a single plastic slug without the necessity of metal or paper components and to provide novel apparatus for use in this method.

Another object of the present invention is to provide a method of forming a shell casing having the tubular portion and the base and rim portion composed of plastic in a highly oriented state by a process having two compression steps, whereby the first compression step results in the proper orientation of the tubular portion and the second compression step results in the proper orientation of the base and rim portion.

Other and further objects, features, and advantages will be apparent from the following description of a presently preferred embodiment of the invention, given for the purpose of disclosure, taken in conjunction with the accompanying drawings, wherein like character references designate like parts throughout the several views and where:

FIG. 1 is a chart graphically illustrating the improved results obtained by use of the present invention, FIG. 2 is a front elevational view of the apparatus used in the present invention, most of the apparatus being shown in section, FIG. 3 is a partial front elevation view of the apparatus shown in FIG. 2, the apparatus being shown as it would be positioned after the first compression step of the process of the present invention, FIG. 4 is a partial front elevation view of the apparatus shown in FIG. 3, but showing the apparatus as it would be positioned after the second compression step.

The type of material that may be used with the present invention may be any crystalline plastic material such as high density polyethylene or polypropylene and the like polymer and/or co-polymers of these materials. One particular material that has been used with satisfactory results is a high density polyethylene which is marketed by Phillips Petroleum Co. under the name of Marlex M 7000. This material prior to the performance of the method which is a part of the present invention is formed into a slug. The slug is placed into the mold cavity and they are heated to a predetermined temperature which is generally above the crystalline melt point of the plastic. For the above-mentioned polyethylene this temperature is 256° F. A wide variety of temperatures may be employed in this operation, but the temperature range for this particular material is generally between 256° and 325° F.

When the desired temperature is reached, a male die member is passed into the mold cavity and contacts the plastic material. The force exerted by the male die member causes the plastic material to take the shape defined by the exterior surface of the male die member and the interior surface of the mold cavity. The pressure exerted by the male die member acting againt the slug in the stationary mold cavity places the plastic material in a state of compression, which results in the plastic flow of the slug and its molecular orientation in the area of the tubular portion of the shell casing. This plastic material is primarily oriented in a direction parallel to the longitudinal axis of the shell casing. This, in effect, results in the tubular portion of the shell casing being formed by a series of laminations extending from the base to the outermost end of the shell casing. The force used in this initial step of compression may, of course, vary greatly. The force used in the preferred embodiment is approximately fifteen tons.

As a result of this compression forming, the tubular member is formed having the major portion made up of highly oriented plastic. The base member, however, remains in a substantially unoriented state. As a result, the tubular portion has great strength while the base portion is relatively weak. This is further explained in Pat. No. 3,171,350 supra.

To give this base portion and its complementary edge or rim portion the strength desired, thus eliminating the need for the metal cap, in accordance with the present invention, a second compression step is performed. The force utilized in this second compression step is once again in the general range of approximately fifteen tons and consists essentially of two steps. The first step is maintaining the male die member in a stationary position whereby the formed shell casing will not change in size or configuration as a result of the secondary compression with the exception of the hole that is formed. The second step is pressing or punching an opening into the base of the casing without a reduction in the amount of material making up the base and rim. As one can readily see, the forming of the opening results in the displacement of a certain amount of the plastic material. By holding the male die member and the cavity stationary, this displacement cannot bring about a change in the size of the casing, and accordingly, this results in a further compression of the material and, in particular, the material making up the base and rim.

As a result of this secondary compression, it has been found that the plastic composing the base and rim of the casing is changed from an unoriented to a highly oriented state. This results in an increased hardness and strength of these areas, thus providing for a more durable and reliable product, whereas before, a metal cap or base would be required on shell casings of this type. Without the metal cap on the prior art plastic shell casings, the ejection mechanism of the gun would not eject the spent casing properly due to the relatively soft plastic rim against which the ejection mechanism operates. Even if the casing were ejected properly, the rim is usually so damaged that the casing cannot be reused for fear of the deformed rim jamming the gun. As a result of the present invention, however, a unitary casing is provided having a rim and base of sufficient hardness and possessing sufficient strength to allow the proper operation of the ejection mechanism without a resulting damage to the rim or base, whereby the casing may be reused. Accordingly, the necessity of a metal cap or base is eliminated with the resulting increase in savings in cost of materials and manufacture.

To demonstrate the increased strength that results in the casing made in accordance with the present invention. FIG. 1 graphically demonstrates the results of tests which were run on casings having an unoriented base and rim, and casings having a base and rim portion composed of plastic in a highly oriented state as produced by the present invention. The line on the graph indicated by the term "Unworked" illustrates the results from the tests performed on the casings with the unoriented bases, and the line indicated by the term "Worked" indicates the test results run on the casings having a highly oriented base and rim as produced by the present invention.

The tests were performed only on the base of the casings, the tubular portions being cut away. The test specimens (the shell base) were loaded by a self-aligning, split-disc test fixture which applied tensile stress to the base. This was accomplished by running two spring steel wire (0.075 inch in diameter) through the split disc located in the whole within the shell base and attaching each wire to a separate force-applying member. Tensile stress is obtained due to the bending moment imposed during the test at the split between the split-disc test fixture. The moment is induced by the change in the contour of the ring between the two disc sections as they separate. The chart shown in FIG. 1 plots the base thickness (inches) against the force (pounds) necessary to produce a failure in the test specimens. As seen in the chart, with the exception of the base having a thickness of 0.065 inch, a susbtantial increase in strength is found in the bases manufactured in accordance with the present invention.

Turning now to apparatus utilized to perform the present invention, there is shown in FIG. 2 a front elevational view of one type of apparatus, most of the elements being shown in section. Numeral 10 indicates a slug of the plastic material which may be preformed to the shape shown and placed within the die cavity 12. Thus the slug 10 may have an indented portion 14 which is used to align the male die member 26. The cavity 12 is formed in a member 16 which is fixedly attached to the surface 18 in such a manner that the cavity remains statitonary during the operation. The cavity has a mouth 20 which further aids in the alignment of the male die 26. At 22 the inner surface cavity flanges outwardly providing a space between the inner wall of the cavity and the male die member 26. Located at the bottom of the cavity is a flange portion 24 which extends around the circumference of the side walls of the cavity and which forms the rim around the base of the shell casing.

The male die 26 has a leading end 28 which is tapered with respect to the rest of the die. The end 28 mates with the indented portion 14 in the slug 10 to insure proper alignment of the slug with the male die. At the opposite end of the male die is a flange member or collar 30 which co-acts with the surface 32 of the cavity containing, or female member 16, thereby preventing the male die member from being inserted too far into the cavity.

The means of providing the necessary force to the male die member 26 is provided in this embodiment by the primary hydraulic cylinder 34. A piston 36 is located within the cylinder and is attached to the piston rod 38, which is, in turn, attached to the male die member 26. The hydraulic fluid is introduced into and removed from the cylinder by suitable valve means 40. A secondary cylinder 42 is located behind the primary cylinder 34 and has its piston rod 44 extending through the chamber of the primary cylinder, the piston 36 and the piston rod 38. Suitable valve means 48 are provided on the secondary cylinder for introduction and removal of the hydraulic fluid. Located on the outermost end of the piston rod 44 is the secondary male die member 46. An interlocking means 45 is provided to move the dies 26 and 46 together when the die 26 is moved downwardly. This may consist of a shoulder 43 on the die 26 and a collar 47 on the arm 44. Suitable sealing means 52 are located in the rear cylinder wall and in the piston 36 of the primary cylinder. As can be seen in FIG. 2, the primary piston rod 38 is a hollow cylindrical member. Communicating with the hollow rod 38 is a passageway 50 in the male die member 26. The hollow piston rod 38 and the passageway 50, provide the secondary compression apparatus with adequate space within which to operate.

The operation of the apparatus is essentially as follows. The slug of plastic material, which may have been somewhat preformed, is placed within the die cavity 12 with the indented portion 14 facing upwardly. The cavity 12 and slug member 10 are then heated by suitable means to a predetermined temperature at which the compression of the plastic can be performed to achieve the desired stress characteristics in the plastic. When the predetermined temperature has been reached, the compression operation is begun. The male die member 26 is located within the opening 20 of the cavity 12 and the hydraulic fluid is fed into the primary cylinder 34 causing the piston 36 to move into the die cavity.

As the hydraulic fluid is fed into the primary cylinder causing the piston 36 and the piston rod 38 to move downwardly (as seen in FIGS. 2, 3 and 4), the leading end 28 of the primary die 26 comes into contact with the indenture 14. As a result of the downward movement of the male die member 26, the plastic material in the slug is compressed and plastically flows into the space between the male die member 26 and the inner walls of the cavity 12, as shown in FIG. 3. When the desired depth of penetration into the cavity by the male die has been reached, the stop collar 30 contacts the surface 32, preventing further penetration. During the movement, the secondary die member 46 moves downwardly with the member 26 because fo the interlocking means 45. At this point the tubular member 52 is completely formed with the exception of the opening in the base 56 and the orientation of the material making up the base 56 and rim 58. The amount of material in the slug 10 is selected to be an amount sufficient to completely fill the space between the male die 26 and the inner walls of the cavity 12 whereby the formed casing 52 is in a state of compression as it is formed. It is this compressive action of the male die 26 relative to the die cavity 12 that properly orients the molecules of the tubular portion 54 of the formed casing as the plastic material is forced upwardly around the male member. The base 56 and rim 58, however, remains substantially unaffected at this stage of the operation.

At this point, the improvement which is the subject of the present invention is performed. The valve 40 is closed, preventing the exit of any fluid from the primary cylinder 34, thus holding the male die 26 stationary. The valve 48 is then operated, allowing the introduction of hydraulic fluid into the secondary cylinder 42, causing the piston rod 44 and its attached secondary die member 46 to move downwardly, as seen in FIG. 4. As the secondary male die 46 leaves the end 28 of the primary die 26, it forces the plastic with which it comes in contact into the already formed base and rim portions, 56 and 58 respectively. The hole 60 is thus formed in the base of the casing 52.

The material which is forced from the hole 60 moves into the previously formed base and rim areas, compressing the material that makes up these areas to an even greater degree and causing further plastic flow. In so doing, this material is changed from an unoriented state to a highly oriented state. Annular laminations within the base and rim are formed, and may be observed upon cutting sections from the casing. As a result the base 56 and the rim 58 attain a strength and durability which is greatly in excess of its strength and durability in its unoriented state. The casing and dies are then cooled and dismantled in a conventional manner to remove the completed shell casing.

Accordingly, as a result of the present invention, an integrally formed casing may be produced having sufficient strength and hardness throughout to permit the casing to function properly in its intended purpose a plurality of times without the aid of a metal base or cap. The other desired objectives sought to be achieved at the outset have also been accomplished by the present invention. A process of manufacturing has been discovered which allows the manufacture from a single unit slug of a shell casing having the required strength and hardness for proper operation. This process of manufacture is both simple and inexpensive. The product produced by the process may be subjected to the high temperatures and pressures and to the normal wear and tear of shell casings without resultant damages to the casing. The rim and base portions are in as highly oriented a state as is the tubular portion, whereby the ejection mechanism of a gun can function properly without fear of damage to the casing or the gun itself. A shell casing has been produced which furthermore is strong enough to be reloaded for reuse a number of times.

The present invention, therefore, is well adapted to carry out the objects and attain the ends and advantages mentioned as well as others inherent therein. While a presently preferred embodiment of the invention has been given for the purpose of disclosure, numerous changes in the detail of construction and the combination, size, shape and arrangement of parts and uses may be resorted to without departing from the spirit and scope of the invention as hereinafter claimed.

What is claimed is:

1. A method for making a plastic cartridge for shotshells and the like, including the steps of, placing a slug of plastic material in a die cavity, compressing the slug with a male die member to form a cartridge, said cartridge having side walls and a base with a peripheral rim, orienting the plastic making up the sidewalls to highly oriented state in a longitudinal direction by said compression and resulting flowing of the material to form the cartridge, and subsequently orienting to a highly oriented state the base and rim of the cartridge by a secondary compression that is concentrated in the center of the base, by forcing an opening through the center of the base without a significant loss of material in the base and rim.

2. A method for making a plastic cartridge for shotshells and the like, including the steps of, placing a slug of plastic material in a die cavity, compressing the slug with a male die member to form a cartridge, said cartridge having side walls and a base with a peripheral rim, orienting the plastic making up the sidewalls to highly oriented state in a longitudinal direction by said compression and resulting flowing of the material to form the cartridge, and subsequently orienting to a highly oriented state the base and rim of the cartridge by a secondary compression that is concentrated in the center of the base, by squeezing an opening through the base which compresses the base and rim a greater amount, whereby the base and rim are changed from a substantially unoriented state to a highly oriented state, and maintaining the size and configuration of the formed cartridge to prevent any significant change in the base and rim, with the exception of the opening formed in said squeezing step.

3. The invention of claim 2 wherein the method is further defined as:

heating the die cavity and the slug to a temperature above the crystalline melt point, compressing the slug to form the cartridge by ramming a male die into the cavity with a force of approximately fifteen tons, dropping the temperature to below the crystalline melt point, the subsequent compression occurring prior to this drop in temperature, and ejecting the formed cartridge.

4. The invention of claim 3 wherein the plastic used is high-density polyethylene and the method is further defined as:

heating the die cavity and slug to a temperature within the range of 256° to 325° F., the subsequent compression utilizes a force of approximately fifteen tons, and the temperature is dropped below 256° F.

References Cited

UNITED STATES PATENTS

| 3,171,350 | 3/1965 | Metcalf | 102—43 |
| 3,184,524 | 5/1965 | Whiteford | 264—94 |
| 3,185,095 | 5/1965 | Mayer | 102—44 |
| 3,198,866 | 8/1965 | Covington | 264—297 |
| 3,284,560 | 11/1966 | King | 264—292 |
| 2,397,626 | 4/1946 | Shriver | 18—59 |
| 3,074,115 | 1/1963 | Albrecht | 264—323X |

FOREIGN PATENTS

| 1,372,728 | 1964 | France. |

ROBERT F. WHITE, Primary Examiner

R. R. KUCIA, Assistant Examiner

U.S. Cl. X.R.

264—296, 320, 323